United States Patent
Son et al.

(10) Patent No.: US 10,550,511 B2
(45) Date of Patent: *Feb. 4, 2020

(54) ANTIMICROBIAL CELLULOSE FIBER AND FABRIC COMPRISING MULTIPLE ANTIMICROBIAL CELLULOSE FIBERS

(71) Applicant: G. CLO Inc., Daegu (KR)

(72) Inventors: Tae-Won Son, Daegu (KR); Hyung-Jin Son, Daegu (KR); Chang-Mok Son, Gyonggi-Do (KR)

(73) Assignee: G.CLO INC., Daegu (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/195,474

(22) Filed: Jun. 28, 2016

(65) Prior Publication Data

US 2016/0305061 A1 Oct. 20, 2016

Related U.S. Application Data

(63) Continuation of application No. 13/872,532, filed on Apr. 26, 2013, now Pat. No. 9,394,377.

(30) Foreign Application Priority Data

Sep. 24, 2012 (KR) .................. 10-2012-0105633

(51) Int. Cl.
| | | |
|---|---|---|
| *D06M 101/06* | (2006.01) | |
| *A01P 1/00* | (2006.01) | |
| *A61K 47/38* | (2006.01) | |
| *D06M 13/438* | (2006.01) | |
| *D06M 16/00* | (2006.01) | |
| *C08B 15/00* | (2006.01) | |
| *C08B 15/06* | (2006.01) | |

(52) U.S. Cl.
CPC ........... *D06M 13/438* (2013.01); *C08B 15/00* (2013.01); *C08B 15/06* (2013.01); *D06M 16/00* (2013.01); *D06M 2101/06* (2013.01); *D06M 2400/01* (2013.01)

(58) Field of Classification Search
CPC ................................................ D06M 2101/06
See application file for complete search history.

(56) References Cited

U.S. PATENT DOCUMENTS

| | | | |
|---|---|---|---|
| 2,988,417 A | 6/1961 | Emmons et al. | |
| 3,046,075 A * | 7/1962 | Kantner | ............................ 8/120 |
| 3,148,021 A * | 9/1964 | Allen | .................. D06M 13/188 |
| | | | 252/8.61 |
| 3,510,487 A * | 5/1970 | Baldwin | ............... A61K 31/495 |
| | | | 514/927 |
| 3,650,670 A | 3/1972 | Tesoro et al. | |
| 3,679,348 A * | 7/1972 | Asahi | .................. D06M 13/127 |
| | | | 8/115.7 |
| 3,715,342 A * | 2/1973 | Colomb, Jr. | ........ C08G 18/6484 |
| | | | 522/153 |
| 3,959,556 A | 5/1976 | Morrison | |
| 4,035,146 A | 7/1977 | Brenner et al. | |
| 4,123,398 A | 10/1978 | Unrau et al. | |
| 4,504,541 A | 3/1985 | Yasuda et al. | |
| 5,316,850 A * | 5/1994 | Sargent | ............... D06M 15/263 |
| | | | 428/378 |
| 5,990,212 A | 11/1999 | Hager et al. | |
| 6,235,302 B1 * | 5/2001 | Mans | ...................... A47L 13/17 |
| | | | 424/404 |
| 7,785,376 B1 | 8/2010 | Chun et al. | |
| 8,404,628 B1 | 3/2013 | May | |
| 2003/0091616 A1 * | 5/2003 | Phaneuf | ............ A61F 13/00995 |
| | | | 424/443 |
| 2003/0134120 A1 | 7/2003 | Kim et al. | |
| 2008/0216256 A1 * | 9/2008 | Freeman | ............... C09B 62/043 |
| | | | 8/549 |

FOREIGN PATENT DOCUMENTS

| | | | | |
|---|---|---|---|---|
| CA | 1236954 A | 5/1988 | | |
| CA | 2158884 A1 * | 3/1996 | ............... | D01F 2/00 |
| JP | 2000314085 A | 11/2000 | | |
| JP | 2009191415 A | 8/2009 | | |
| KR | 2000-0059156 A | 10/2000 | | |
| KR | 20010101788 | 11/2001 | | |
| KR | 100396156 B1 | 8/2003 | | |
| KR | 20060128417 A | 12/2006 | | |
| KR | 100876111 B1 | 12/2008 | | |
| KR | 100887768 B1 | 4/2009 | | |
| WO | WO-2007078203 A1 * | 7/2007 | ............. | D01F 1/103 |
| WO | WO-2007102184 A2 * | 9/2007 | ............... | D01C 1/02 |
| WO | PCT/KR2013/008496 | 12/2013 | | |

OTHER PUBLICATIONS

PubChem. Guanidine. Date retrieved: Jul. 2, 2018. <https://pubchem.ncbi.nlm.nih.gov/compound/guanidine#section=Top>. (Year: 2018).*
ChemSpider. Fluoroquinolone. Date Retrieved: Dec. 11, 2018. <http://www.chemspider.com/Chemical-Structure.9270105.html>. (Year: 2018).*
PubChem. Penicillin. Retrieved in 2019. <https://pubchem.ncbi.nlm.nih.gov/compound/penicillin_g>. (Year: 2019).*

* cited by examiner

Primary Examiner — Tracy Liu
(74) Attorney, Agent, or Firm — Ryan, Mason & Lewis, LLP

(57) ABSTRACT

Antimicrobial cellulose fibers and antimicrobial cellulose fabrics are provided herein. Such an antimicrobial fiber can include a reactive antimicrobial compound comprising an antimicrobial agent that reacted with at least one reactive compound, and wherein the reactive antimicrobial compound is chemically fixed to a cellulose fiber.

6 Claims, 4 Drawing Sheets

ANTIMICROBIAL CELLULOSE FIBER AND FABRIC COMPRISING MULTIPLE ANTIMICROBIAL CELLULOSE FIBERS

CROSS-REFERENCE TO RELATED APPLICATION

This application is a continuation of U.S. patent application Ser. No. 13/872,532, filed Apr. 29, 2013, the disclosure of which is incorporated herein by reference in its entirety, and which claims priority under 35 U.S.C. § 119 from Korean Patent Application No. 10-2012-0105633 filed Sep. 24, 2012, the disclosure of which is incorporated herein by reference in its entirety.

FIELD

The present application relates to a method for producing an antimicrobial cellulose fiber by reacting a reactive compound with an antimicrobial agent to prepare a reactive antimicrobial compound, chemically fixing the reactive antimicrobial compound to a cellulose fiber through chemical bonding between the reactive compound and the cellulose fiber, and stabilizing the cellulose fiber structure. The present application also relates to a fiber produced by the method and a fabric using the fiber.

BACKGROUND

Cellulose is a major substance that constitutes the cell walls of plants. Cellulose is a biomass material that is produced in a large quantity on the earth and is biodegradable in nature. Cellulose has been the subject of attention with the recent increasing interest in environmental protection.

Cellulosic materials are available in the form of fibers from plants in nature. Such cellulose fibers include, for example, cotton, hemp and pulp fibers. Cellulose fibers are used in various ways. For example, staple fibers, such as cotton and hemp fibers, are spun without further processing. Rayon and lyocell fibers are dissolved in solvents and wet spun to produce yarns. Cellulose derivatives, such as cellulose acetate, are dissolved in an organic solvent, such as methylene chloride or acetone, and are spun into yarns by dry spinning while evaporating the solvent.

Cellulose fibers have long been used due to their good wearability. The recent increasing demand for environmentally friendly materials has increased the use of cellulose fibers. Cellulose fibers are excellent in terms of sweat absorption because of their higher hydrophilicity than other fibers, thus being suitable for use in outdoor clothes, sports clothes, shirts and underclothes that are in direct contact with the skin.

However, since cellulose fibers are very ecologically friendly, they provide environments where various kinds of microbes grow, tend to produce unpleasant smells, such as smell of sweat, and generate static electricity. There is thus a need to develop an antimicrobial and deodorizing processing technique that imparts hygienic and safety functions to cellulose fibers.

Antimicrobial and deodorizing processing is not for the purpose of sterilization or treatment but is intended to inhibit the inhabitation and proliferation of bacteria and fungi on fibers. Antimicrobial and deodorizing processing should be safe in humans while persistently maintaining antimicrobial effects to some extent rather than high antimicrobial activity.

General organic antimicrobial materials are easier to process than inorganic antimicrobial materials and have no significant influence on the mechanical properties, transparency and color of fibers. Due to these advantages, organic antimicrobial materials have been predominantly used so far in fibers. Halamine, hydantoin, imidazolidinone, sulfadiazine and derivatives thereof are known as organic antimicrobial materials for use in cellulose fibers. These organic antimicrobial materials lack persistent antimicrobial effects and are particularly inferior in terms of heat resistance, which limits their use. Some organic antimicrobial materials cause problems such as skin irritation and lacrimation.

In comparison with organic antimicrobial materials, inorganic antimicrobial materials have good heat resistance and are highly stable without being volatilized and decomposed. Due to these advantages, inorganic antimicrobial materials can be used in a wide range of applications. Some metals, such as silver, copper and zinc, have strong antimicrobial activity and high safety and are currently known to be harmless to humans. However, since these metals tend escape from cellulose fibers, for example, during washing, their antimicrobial functions do not last long.

Many methods for imparting antimicrobial performance to fibers are known at present. Most of these methods are dependent on post processing of yarns or clothes. However, post processing is still unsatisfactory in terms of durability and fastness. For this reason, post processing is not actively applied to the clothing industry.

More specifically, post processing is limited in obtaining antimicrobial performance. For example, when a binder is added to fixedly attach antimicrobial particles to a cloth, only a limited amount of the binder is permitted, thus limiting the amount of the antimicrobial particles. Only a few cycles of washing causes the antimicrobial particles to escape from the cloth, and as a result, antimicrobial functions of the antimicrobial particles are lost. Many proposals have been made to solve the above problems. The present inventor has developed a skin-core short fiber having a bilayer consisting of a cellulose core layer and a metal skin layer (see Korean Patent Publication No. 2000-0059156). The short fiber is produced by coating a cellulose fiber with metal components.

High electrical conductivity of the metal skin layer ensures the ability of the short fiber to block electromagnetic waves and inhibit the generation of static electricity. Antimicrobial activity of the metal components makes the short fiber hygienically desirable.

However, the production of the skin-core short fiber involves complicated processing steps, including etching of the cellulose fiber, dipping in a reducing agent solution, dipping in a solution of a catalytic metal salt to uniformly deposit fine particles of the catalytic metal on the surface, pre-settling, and electroless plating. The metal constituting the skin layer is bound to the cellulose fiber constituting the core layer taking advantage of the affinity of the anionic polymer. Therefore, in response to changes in ambient environments, the binding force between the metal layer and the cellulose may gradually deteriorate, resulting in separation of the two layers.

Further, Korean Patent Registration No. 0876111 discloses a method for producing an antimicrobial fiber coated with silver nanoparticles. The method includes coating a mixed solution including silver ions and an aliphatic or aromatic amine compound on a fiber, such as cotton, containing alcohol functional groups. By the coating, the silver ions are sequentially adsorbed to the fiber surface through the oxygen atoms of the alcohol groups. The ions function as seeds for the deposition of the reduced silver.

Further, Korean Patent Registration No. 0396156 discloses a method for producing a functional fabric which includes mixing tourmaline, which is an inorganic material having good ability to generate anions, as a major factor with small amounts of other inorganic materials, mixing the tourmaline mixture with a pigment and an aid composition to prepare a padding solution, padding a fabric, such as cotton, with the padding solution, and sequentially pressing, drying, heat treating and tentering the padded fabric.

Further, Korean Patent Registration No. 0887768 discloses a method for producing a hydrous tissue having antibacterial and antifungal functions. The method includes impregnating a tissue fabric manufactured using a fiber (such as cotton) as a raw material with water containing metal nanoparticles and silver nanoparticles.

As described above, antimicrobial materials, such as silver, are mainly coated on the surface of fibers to provide antimicrobial performance to the fibers. However, the binding force between the antimicrobial materials and the fibers is not strong enough to prevent the antimicrobial particles from escaping from clothes, resulting in gradual deterioration of antimicrobial functions.

SUMMARY

Embodiments of the present invention have been made in an effort to solve the problems of the prior art, and it intends to impart antimicrobial functions to a cellulose fiber and tightly bind an antimicrobial material to the cellulose fiber so that fastness of the antimicrobial functions can be prevented from deteriorating, for example, during washing.

According to an embodiment of the present invention, there is provided a method for producing an antimicrobial cellulose fiber, the method including: reacting an antimicrobial agent with at least one reactive compound selected from the group consisting of triazine compounds, pyrimidine compounds, quinoxaline compounds, vinyl sulfone compounds, epoxy compounds, urethane compounds and acrylamide compounds to prepare a reactive antimicrobial compound; chemically fixing the reactive antimicrobial compound to a cellulose fiber through chemical bonding between the reactive compound and the cellulose fiber such that the reactive antimicrobial compound is contained in an amount of 0.1 to 10.0% by weight with respect to the weight of the cellulose fiber; and stabilizing the cellulose fiber structure by reaction with a metal compound or heat treatment.

The antimicrobial agent is preferably selected from the group consisting of: natural antimicrobial agents, including macrolides, aminoglycosides, cephems, penicillins, chitosans, chitins, hyaluronic acids, alginic acids, carrageenans, xanthans, gellans, amino acids, and proteins; synthetic antimicrobial agents, including quinolones, sulfonamides, diamidines, bisphenols, guanidines, biguanides, imidazoliums, hexidines, sulfanilic acids, salicylic acids, aminobenzoic acids, hydantoins, and imidazolidinones; antifungals; antivirals; and mixtures thereof.

The reactive compound is preferably selected from the group consisting of cyanuric chloride, tetrachloropyrimidine, chlorocarbonyldichloroquinoxaline, sulfoethanesulfonic acid, epichlorohydrin, glyoxalurethane, bromoacrylamide, and mixtures thereof.

The reactive antimicrobial compound is preferably prepared by dissolving 1 to 10 g/l of a nonionic surfactant in water at 0 to 40° C. for 10 to 30 minutes, dispersing 10 to 300 g/l of the reactive compound in the aqueous solution to prepare an aqueous dispersion, adding 5 to 10 divided portions of the antimicrobial agent in an equimolar amount to the reactive compound to the aqueous dispersion for 10 to 100 minutes, and reacting the reactive compound with the antimicrobial agent at 10 to 90° C. for 0.5 to 6 hours.

The reactive antimicrobial compound is preferably chemically fixed to a cellulose fiber by: dipping a cellulose fiber or fabric in an aqueous solution of 10 to 100 g/l of the reactive antimicrobial compound, 5 to 50 g/l of sodium carbonate and 20 to 200 g/l of sodium sulfate in a liquor ratio of 1:5-50 at 40 to 90° C. for 10 to 100 minutes to form chemical bonds; or padding a cellulose fiber or fabric with an aqueous solution of 10 to 100 g/l of the reactive antimicrobial compound, 10 to 100 g/l of sodium carbonate and 10 to 100 g/l of sodium sulfate, and treating the padded cellulose fiber or fabric with steam or dry heat at 100 to 180° C.

The cellulose fiber structure is preferably stabilized by: reacting the cellulose fiber structure with an aqueous solution of 0.5 to 5.0% by weight of at least one metal compound selected from the group consisting of sodium hydroxide, potassium hydroxide, calcium hydroxide, sodium carbonate, silver nitrate, zinc sulfate, zinc chloride, tin chloride, calcium chloride and copper sulfate at 10 to 90° C. until the content of the metal compound reaches 0.05 to 5.00% by weight with respect to the weight of the cellulose fiber; or dipping the cellulose fiber structure in an aqueous solution of at least one functional agent selected from the group consisting of organometallic compounds, organosilicon compounds, organofluorine compounds, organophosphorus compounds and organonitrogen compounds, followed by steam or dry heat treatment at 100 to 200° C. for 10 seconds to 10 minutes.

According to another embodiment of the present invention, there is provided an antimicrobial cellulose fiber that is produced by the method and has a bacteriostatic reduction rate of 99.00 to 99.99%. According to yet another embodiment of the present invention, there is provided an antimicrobial cellulose fabric manufactured using the fiber.

The antimicrobial cellulose fiber according to an embodiment of the present invention is a human friendly material that has excellent antimicrobial activity and deodorizing performance. The antimicrobial cellulose fiber according to an embodiment of the present invention can be manufactured in the form of raw cotton, sliver, roving yarn, spun yarn, woven fabric, knitted fabric, non-woven fabric, etc. The antimicrobial cellulose fiber according to an embodiment of the present invention may be blended with other fibers, such as natural fibers and synthetic fibers. In this case, depending on the kind of the blended fibers and the blending methods and rates, the antimicrobial cellulose fiber of an embodiment of the present invention can be used to manufacture products suitable for various applications.

In addition, the antimicrobial agent is preferably stably bound to the cellulose fiber through chemical bonding between the reactive compound and the cellulose fiber. This chemical bonding prevents the antimicrobial agent from easily escaping from the fiber, for example, during washing, allowing the antimicrobial cellulose fiber to maintain its antimicrobial functions for a long time.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
FIG. 1 is a report showing test results for the antibacterial activity of a cotton fabric manufactured by weaving an antimicrobial cotton fiber produced in Example 1 against *Staphylococcus aureus* as a test bacterial strain.

Embodiments of the present invention provide a method for producing an antimicrobial cellulose fiber. Specifically, the method includes reacting a reactive compound with an antimicrobial agent to prepare a reactive antimicrobial compound, chemically fixing the reactive antimicrobial compound to a cellulose fiber through chemical bonding between the reactive compound and the cellulose fiber, and stabilizing the cellulose fiber structure. The reactive compound serves to stably bind the antimicrobial agent to the cellulose fiber.

According to a method of an embodiment of the present invention, an antimicrobial cellulose fiber is produced by the following procedure. First, an antimicrobial agent is allowed to chemically react with a reactive compound to prepare a reactive antimicrobial compound. As described above, the reactive compound serves to stably bind the antimicrobial agent to a cellulose fiber in the subsequent step.

The reactive antimicrobial compound is also abbreviated as "ReAm". The reactive compound serves to chemically bind the reactive antimicrobial compound to a cellulose fiber and is defined as a reactive group, abbreviated as "Re". The antimicrobial agent exhibits antimicrobial functions and is defined as a functional group, abbreviated as "Am".

The reactive group Re may be selected from the group consisting of triazine compounds, pyrimidine compounds, quinoxaline compounds, vinyl sulfone compounds, epoxy compounds, urethane compounds, and acrylamide compounds. Specifically, an example of the triazine compounds is cyanuric chloride, an example of the pyrimidine compounds is tetrachloropyrimidine, an example of the quinoxaline compounds is chlorocarbonyldichloroquinoxaline, an example of the vinyl sulfone compounds is sulfoethanesulfonic acid, an example of the epoxy compounds is epichlorohydrin, an example of the urethane compounds is glyoxalurethane, and an example of the acrylamide compounds is bromoacrylamide.

The reactive group Re reacts with the functional group Am to synthesize the reactive antimicrobial compound ReAm and serves to stably bind the reactive antimicrobial compound ReAm to a cellulose fiber in the subsequent step.

The functional group Am may be selected from the group consisting of natural antimicrobial agents, synthetic antimicrobial agents, antifungals, and antivirals. Specific examples of the natural antimicrobial agents include macrolides, aminoglycosides, cephems, penicillins, chitosans, chitins, hyaluronic acids, alginic acids, carrageenans, xanthans, gellans, amino acids, and proteins. Specific examples of the synthetic antimicrobial agents include quinolones, sulfonamides, diamidines, bisphenols, guanidines, biguanides, imidazoliums, hexidines, sulfanilic acids, salicylic acids, aminobenzoic acids, hydantoins, and imidazolidinones. The antimicrobial agent is not limited to a specific kind so long as it exhibits antimicrobial effects and is safe in humans.

The reactive antimicrobial compound ReAm is synthesized by dispersing the reactive group Re in water, and mixing the dispersion with the functional group Am to react the reactive group Re with the functional group Am. Specifically, the reactive antimicrobial compound is prepared by dissolving 1 to 10 g/l of a nonionic surfactant in water at 0 to 40° C. for 10 to 30 minutes, dispersing 10 to 300 g/l of the reactive group in the aqueous solution to prepare an aqueous dispersion, adding 5 to 10 divided portions of the functional group Am in an equimolar amount to the reactive group to the aqueous dispersion for 10 to 100 minutes, and reacting the reactive group Re with the functional group Am at 10 to 90° C. for 0.5 to 6 hours.

The synthetic process may be varied depending on the kind of the reactive group Re.

For example, in the case of using a triazine compound as the reactive group Re, the reactive antimicrobial compound ReAm may be synthesized by homogeneously dispersing 10 to 300 g/l of cyanuric chloride as the triazine compound and 1 to 10 g/l of a nonionic surfactant in water at 0 to 5° C. for 10 to 30 minutes to prepare an aqueous dispersion, adding 5 to 10 divided portions of sulfamethazine or sulfanilamide as the functional group Am in an equimolar amount to the cyanuric chloride to the aqueous dispersion for 10 to 100 minutes, and reacting the reactive group Re with the functional group Am with stirring at 10 to 60° C. for 0.5 to 3 hours.

As an alternative example, a pyrimidine compound may be used as the reactive group Re. In this case, the reactive antimicrobial compound ReAm may be synthesized by homogeneously dispersing 10 to 300 g/l of tetrachloropyrimidine as the pyrimidine compound and 1 to 10 g/l of a nonionic surfactant in water at 20 to 40° C. for 10 to 30 minutes to prepare an aqueous solution, adding 5 to 10 divided portions of sulfamethazine or sulfanilamide as the functional group Am in an equimolar amount to the tetrachloropyrimidine to the aqueous solution for 10 to 100 minutes, and reacting the reactive group Re with the functional group Am with stirring at 20 to 80° C. for 1 to 6 hours.

As another example, an epoxy compound may be used as the reactive group Re. In this case, the reactive antimicrobial compound ReAm may be synthesized by homogeneously dispersing 10 to 200 g/l of epichlorohydrin as the epoxy compound in a mixture of 50 to 90% by weight of water and ethanol for 10 to 30 minutes to prepare an aqueous solution, adding 5 to 10 divided portions of sulfamethazine or sulfanilamide as the functional group Am in an equimolar amount to the epichlorohydrin to the aqueous solution for 10 to 100 minutes, and reacting the reactive group Re with the functional group Am with stirring at 30 to 90° C. for 1 to 4 hours.

The triazine, pyrimidine and quinoxaline compounds react with the functional group by substitution reactions, and the epoxy compound reacts with the functional group by an addition reaction to synthesize the reactive antimicrobial compound. Alkalis may be added as catalysts to accelerate the reactions.

Examples of alkalis available as catalysts include caustic soda, sodium carbonate, sodium percarbonate, and sodium acetate. The alkali is added portionwise in an amount corresponding to a molar ratio of 0.5 to 1.0 to the functional group Am to an aqueous solution of the reactive group Re for 0.5 to 2 hours.

Next, the reactive antimicrobial compound is chemically fixed to a cellulose fiber through covalent bonding.

The chemical fixation may be performed by dipping a cellulose fiber (e.g., raw cotton, sliver, roving yarn or spun yarn) or a fabric (e.g., a woven fabric, knitted fabric or non-woven fabric) manufactured by weaving, knitting or binding the cellulose fiber in an aqueous solution of 10 to 100 g/l of the reactive antimicrobial compound, 5 to 20 g/l of sodium carbonate and 50 to 200 g/l of sodium sulfate in a liquor ratio of 1:5-50 at 40 to 90° C. for 10 to 100 minutes to form chemical bonds. Alternatively, the chemical fixation may be performed by a pad dry cure process. According to the pad dry cure process, a cellulose fiber or fabric is padded with an aqueous solution of 10 to 100 g/l of the reactive antimicrobial compound, 10 to 100 g/l of sodium carbonate and 10 to 100 g/l of sodium sulfate, and the padded cellulose fiber or fabric is treated with steam or dry heat at 100 to 180° C.

At this time, the reactive antimicrobial compound is preferably contained in an amount of 0.1 to 10.0% by weight, more preferably 0.5 to 5.0% by weight, based on the weight of the cellulose fiber. If the content of the reactive antimicrobial compound is less than 0.1% by weight, insignificant antimicrobial effects are obtained. Meanwhile, if the content of the reactive antimicrobial compound exceeds 10.0% by weight, it is economically disadvantageous.

An exemplary mechanism of the chemical fixation of a vinyl sulfone compound as the reactive compound to the cellulose fiber is depicted in Reaction Scheme 1. Referring to Reaction Scheme 1, the antimicrobial agent Am reacts with sulfoethanesulfonic acid as the reactive compound to prepare the reactive antimicrobial compound in which the antimicrobial agent Am is bonded to the vinyl sulfone, and then the reactive antimicrobial compound is chemically fixed to the hydroxyl groups of the cellulose fiber through chemical bonding.

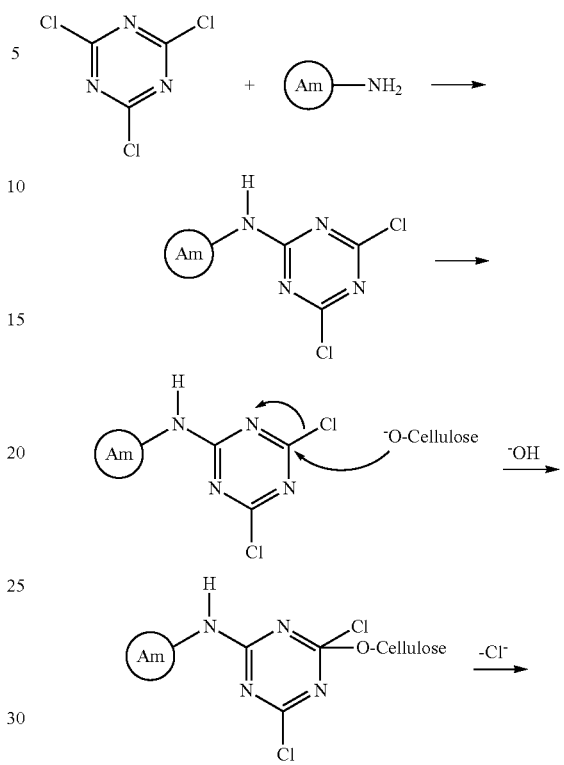

Reaction Scheme 2

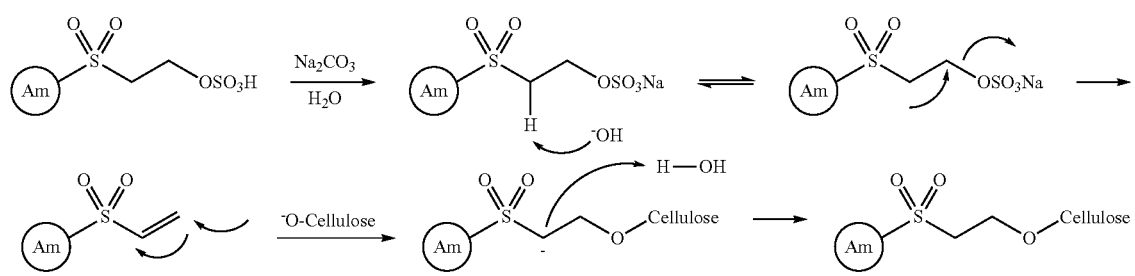

Reaction Scheme 1

Another exemplary mechanism of the chemical fixation of a triazine compound as the reactive compound to the cellulose fiber is depicted in Reaction Scheme 2. Referring to Reaction Scheme 2, the antimicrobial agent Am having an amino group reacts with cyanuric chloride as the reactive compound to prepare the reactive antimicrobial compound in which the antimicrobial agent Am is bonded to the triazine compound (2-amino-4,6-dichloro-s-triazine), and then the reactive antimicrobial compound is chemically fixed to the hydroxyl groups of the cellulose fiber through chemical bonding.

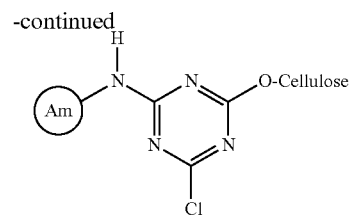

-continued

Examples of cellulose fibers suitable for use in embodiments of the present invention include: vegetable fibers, such as cotton fiber, hemp fiber, pulp, sisal, abaca, kapok, kudzu fiber, flax, jute, ramie, hemp, kenaf, coir, and sacaton; regenerated fibers, such as viscose rayon, copper-ammonium rayon, polynosic rayon, lyocell, tencel, cellulose acetate, and cellulose triacetate; and naturally occurring protein fibers, such as animal fibers (wool, silk, cashmere, mohair, alpaca, huarizo, guanaco, misti, vicuna, llama, qiviut, cashgora, and camel hair), and regenerated protein fibers (meat protein fibers, milk protein fibers and vegetable protein fibers).

In the cellulose fiber structure, the reactive antimicrobial compound is chemically fixed to the cellulose fiber and the antimicrobial agent is stably bound to the cellulose fiber through the reactive compound. Due to the chemical bonding and stable binding, the antimicrobial compound can be prevented from easily escaping from the fiber, for example, during washing, and as a result, the antimicrobial cellulose fiber can maintain its antimicrobial functions for a long time.

Next, the cellulose fiber structure is stabilized by treatment with a metal promoter or heat treatment. This stabilization further improves the antimicrobial performance, functionality or fastness of the antimicrobial cellulose fiber.

For example, the cellulose fiber structure may be stabilized by reacting an aqueous solution of 0.5 to 5.0% by weight of a metal compound as the metal promoter with the cellulose fiber structure at 10 to 90° C. until the content of the metal compound reaches 0.05 to 5.00% by weight with respect to the weight of the cellulose fiber. The metal compound is selected from the group consisting of sodium hydroxide, potassium hydroxide, calcium hydroxide, sodium carbonate, silver nitrate, zinc sulfate, zinc chloride, tin chloride, calcium chloride, copper sulfate, and mixtures thereof.

The metal compound is dissociated into metal ions in the aqueous solution. The metal ions are adsorbed to the fiber by the hydroxyl groups of the cellulose fiber and react with the reactive antimicrobial compound to form complexes. The complexation improves the antimicrobial activity of the cellulose fiber. The complexes do not easily escape from the fiber, for example, during washing due to their insolubility.

The heat treatment is performed by dipping the cellulose fiber structure in an aqueous solution of at least one functional agent selected from catalysts, softeners, water repellents, flame retardants and function enhancers, followed by treatment with steam or dry heat at 100 to 200° C. for 10 seconds to 10 minutes. This heat treatment further strengthens the bonds between the cellulose fiber and the reactive antimicrobial compound to achieve improved fastness of the antimicrobial cellulose fiber.

The catalysts are preferably organometallic compounds, the softeners are preferably organosilicon compounds, the flame retardants are preferably organofluorine or organophosphorus compounds, and the function enhancers are preferably organonitrogen compounds. The functional agent, together with the reactive antimicrobial agent, serves various functions, including deodorization, flexibility, water repellency, flame retardancy, water absorptivity, quick drying, moisture absorption-heat release properties, and UV blocking properties.

An embodiment of the present invention also provides an antimicrobial cellulose fiber produced by the method according to an embodiment of the present invention. The antimicrobial cellulose fiber according to an embodiment of the present invention has a bacteriostatic reduction rate of 99.00 to 99.99% and exhibits a deodorization rate of 90 to 100% against basic bad odors. The antimicrobial cellulose fiber according to an embodiment of the present invention can be manufactured into any form, including raw cotton, sliver, roving yarn, spun yarn, woven fabric, knitted fabric, non-woven fabric, etc. The antimicrobial cellulose fiber according to an embodiment of the present invention may be blended with other fibers, such as natural fibers and synthetic fibers. In this case, depending on the kind of the blended fibers and the blending methods and rates, the antimicrobial cellulose fiber according to an embodiment of the present invention can be used to manufacture products suitable for various applications.

Embodiments of the present invention will be explained in more detail with reference to the following examples, including test examples.

However, these examples are provided for illustrative purposes only and are not intended to limit embodiments of the present invention. It will be evident to those skilled in the art that substitutions and equivalents can be made to these embodiments without departing from the spirit of the present invention.

Example 1

7.38 g of cyanuric chloride was added to a solution of 0.6 g of Triton X-100 as a surfactant in 200 ml of water and was dispersed with stirring for 10 min while maintaining the temperature at 5° C.

To the dispersion was added 50 ml of an aqueous solution of 6.89 g of sulfanilamide and 1.6 g of caustic soda in 5 divided portions for 30 min. The mixture was heated to 20° C. and stirred for 90 min to synthesize a reactive antimicrobial compound.

Next, 37.5 g of sodium chloride was added to the reactive antimicrobial compound to give a precipitate. The precipitate was filtered, washed to remove unreacted materials, dried, and pulverized into a powder of the purified reactive antimicrobial compound.

100% refined cotton fiber was dipped in an aqueous solution containing 50 g/l of the purified reactive antimicrobial compound powder, 15 g/l of sodium carbonate and 50 g/l of sodium sulfate at 40° C. for 30 min. The cotton fiber was used in a liquor ratio of 1:10 such that the pure reactive antimicrobial compound powder was 3.5% o.w.f. (on the weight of fiber). The cotton fiber was washed with water and dried to produce a cellulose fiber to which the reactive antimicrobial compound was chemically fixed.

The cellulose fiber structure was dipped in an aqueous solution of an organometallic compound, an organosilicon compound, an organofluorine compound, an organophosphorus compound and an organonitrogen compound. Each of the organic compounds was used in an amount of 0.2 wt %. The resulting cellulose fiber structure was treated with steam at 150° C. for 3 minutes to produce an antimicrobial cellulose fiber.

Test Example 1

Measurements of Antibacterial Activity and Deodorization Rate

The antimicrobial cellulose fiber of Example 1 was woven into a cotton fabric. For testing and analysis, the cotton fabric was sent to the Korea Textile Development Institute (KTDI).

Figure 2:
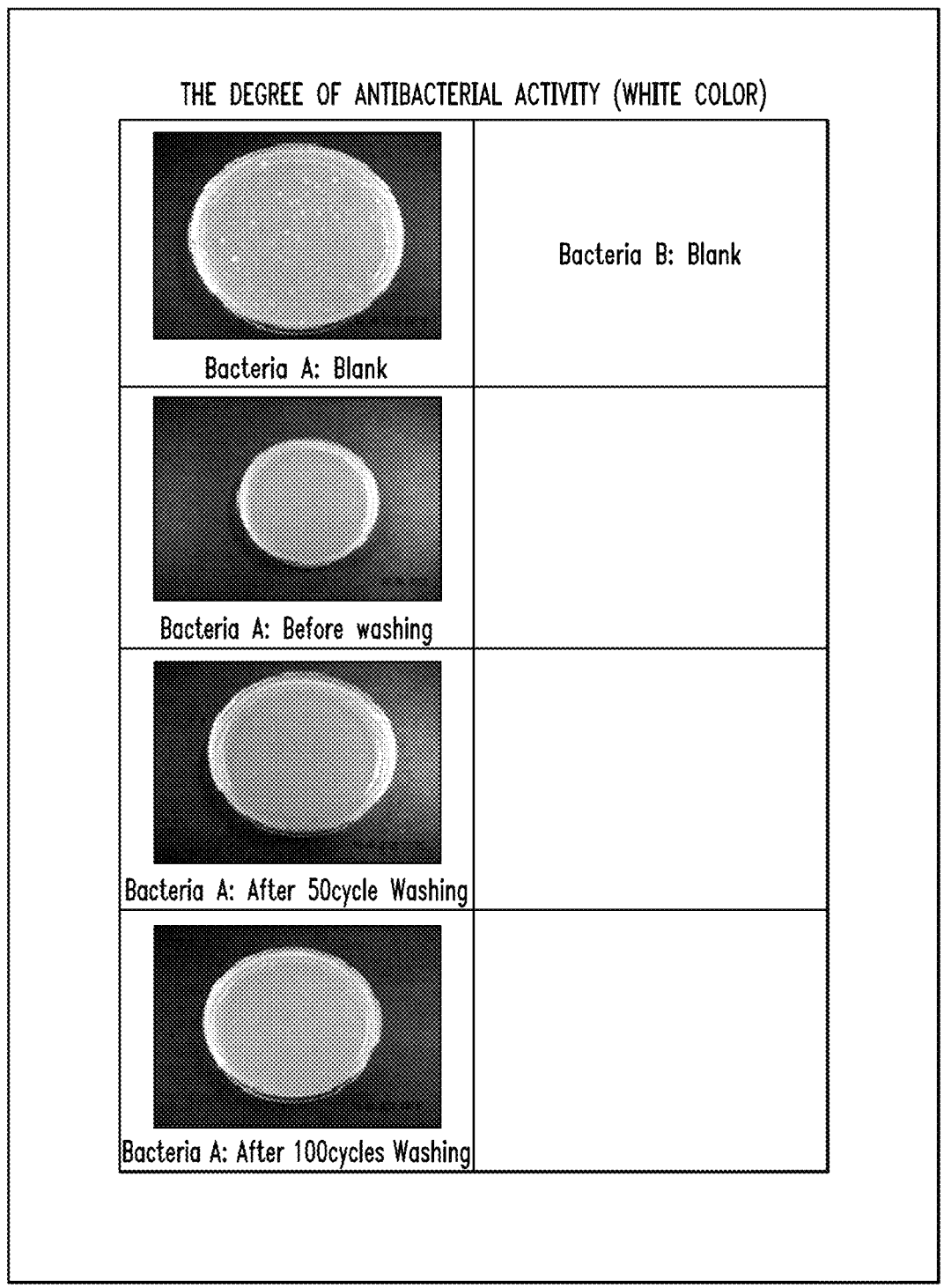
FIG. 2 shows images showing bacterial growth in a cotton fabric manufactured by weaving an antimicrobial cotton fiber produced in Example 1.

The cotton fabric was tested using *Staphylococcus aureus* (ATCC 6538) as a test bacterial strain according to the testing method of KS K 0693-2007. The test results are shown in FIGS. 1 and 2. As shown in FIG. 1, the cotton fabric samples before washing and after 50 cycles of washing by the method of KS K ISO 6330:2011 had bacteriostatic reduction rates of 99.9% or above. The bacteriostatic reduction rate of the cotton fabric sample after 100 cycles of washing was measured to be 98.6%.

In FIG. 2, the bacteria are indicated by the white spots. Bacteria A: Blank is an image of a general cotton fabric. The image shows that many bacteria proliferated. In contrast, few or no bacteria were observed in the samples of the antimicrobial cotton fabric according to an embodiment of the present invention before washing, after 50 cycles of washing, and after 100 cycles of washing.

The deodorization rate was tested on ammonia gas by using a detector tube method. After 2 hr, the antimicrobial cotton fabric according to an embodiment of the present invention was measured to have a deodorization rate of 95% against ammonia gas.

Example 2

0.02 moles of cyanuric chloride was mixed with a small amount of an acid and homogeneously dispersed in 200 ml of distilled water with stirring while maintaining the temperature at 5° C. or below.

0.02 moles of sulfamethazine and a small amount of an acid were sequentially added to distilled water, and dispersed while maintaining the temperature at 5° C. or below.

The sulfamethazine solution was slowly added to the cyanuric chloride solution to allow the reaction to proceed for 2 hr. After completion of the reaction, the reaction solution was cooled, neutralized, dehydrated, and dried under vacuum to obtain a reactive antimicrobial compound of sulfamethazine.

Water and glacial acetic acid were added to the reactive antimicrobial compound to prepare a reaction solution. A cotton fabric woven from 100% refined cotton fiber was treated with the reaction solution at 40° C. for 30 min such that the reactive antimicrobial compound was contained in an amount of 0.1% o.w.f. The treated cotton fiber was washed with water and dried to obtain a cotton fabric to which the reactive antimicrobial compound was chemically fixed.

The cotton fabric structure was dipped in an aqueous solution of 1.0 wt % of silver nitrate to form a silver ion complex of sulfamethazine.

Test Example 2

Antibacterial Activity Measurement

The antimicrobial cotton fabric of Example 2, in which the silver ion complex was formed, was sent to the Korea Textile Development Institute (KTDI) for testing and analysis.

The antimicrobial cotton fabric was tested using *Staphylococcus aureus* (ATCC 6538) and *Klebsiella pneumoniae* (ATCC 4352) as test bacterial strains in accordance with the testing method of KS K 0693-2011. The concentrations of the inoculants *Staphylococcus aureus* and *Klebsiella pneumoniae* were $1.3 \times 10^5$ CFU/ml and $1.5 \times 10^5$ CFU/ml, respectively.

Figure 3:
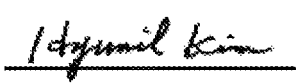
FIG. 3 is a report showing test results for the antibacterial activity of a cotton fabric manufactured in Example 2 against *Staphylococcus aureus* and *Klebsiella pneumoniae* as a test bacterial strain.

The antimicrobial fabric samples were washed 50 times in accordance with the method of KS K ISO 6330:2006. The test results are shown in FIG. 3. Referring to FIG. 3, both *Staphylococcus aureus* and *Klebsiella pneumoniae* were measured to have bacteriostatic reduction rates of >99.9%.

Figure 4:
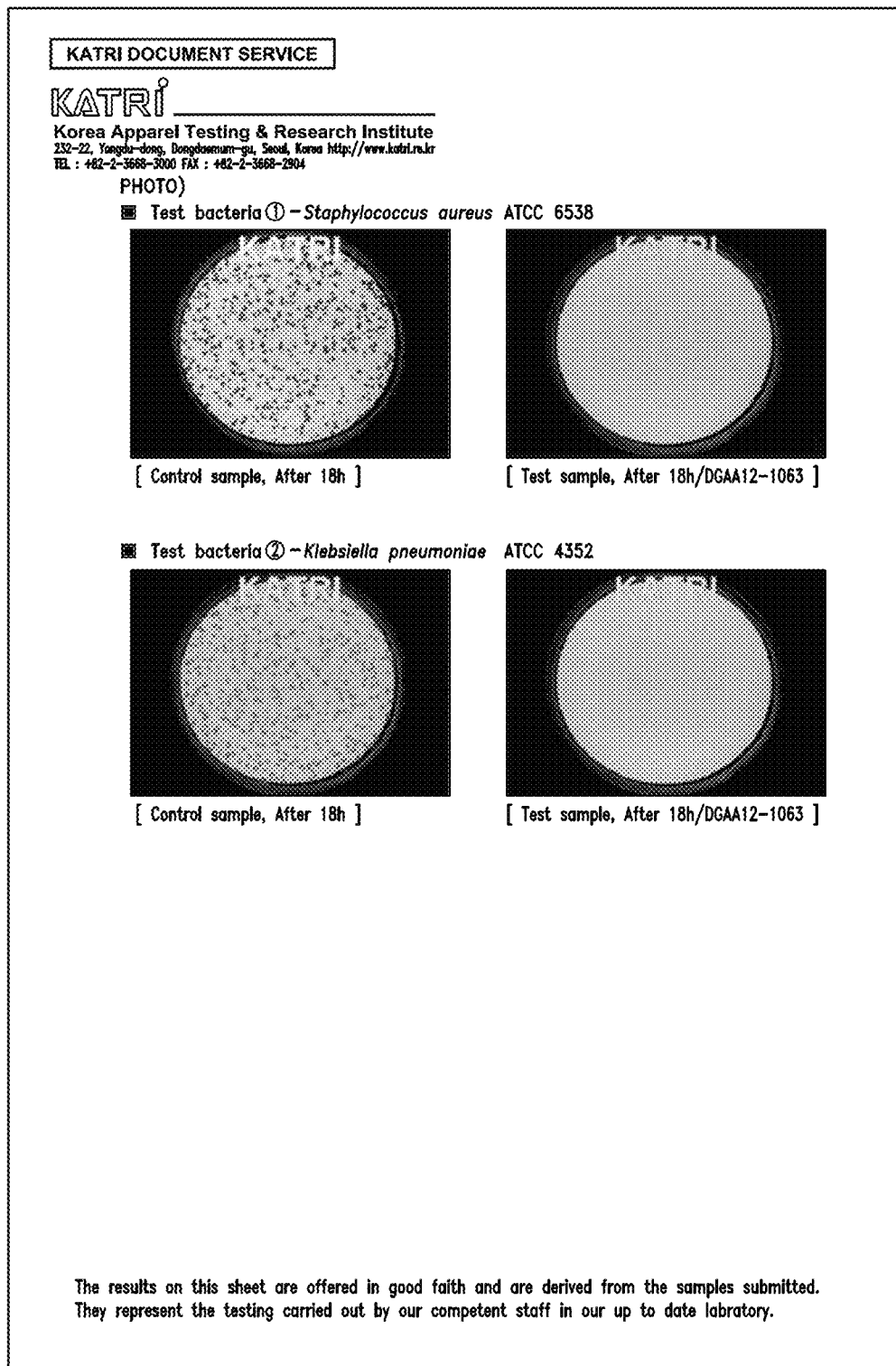
FIG. 4 shows images showing bacterial growth in a cotton fabric manufactured in Example 2.

Images were taken 18 hr after inoculation of the bacteria into general cotton fabrics as control samples, and are shown in FIG. 4. From the images, it can be confirmed that *Staphylococcus aureus* and *Klebsiella pneumoniae* prolifer-ated. Images were taken 18 hr after inoculation of the bacteria into the antimicrobial cotton fabric samples of Example 2 as test samples, and are shown in FIG. 4. As can be seen from the images, none of *Staphylococcus aureus* and *Klebsiella pneumoniae* was visually observed.

What is claimed is:

1. An antimicrobial cellulose fiber composition comprising:
    a reactive antimicrobial compound comprising an antimicrobial agent and a reactive compound, wherein the reactive compound comprises a mixture of cyanuric chloride, tetrachloropyrimidine, chlorocarbonyldichloroquinoxaline, sulfoethanesulfonic acid, epichlorohydrin, glyoxalurethane, and bromoacrylamide, and wherein the antimicrobial agent comprises a mixture of one or more macrolides, one or more aminoglycosides, one or more cephems, one or more penicillins, one or more chitins, one or more hyaluronic acids, one or more carrageenans, one or more gellans, one or more diamidines, one or more imidazoliums, one or more hexidines, one or more salicylic acids, one or more aminobenzoic acids, one or more hydantoins, and one or more imidazolidinones, and wherein the reactive antimicrobial compound further comprises one or more alkalis comprising sodium percarbonate; and
    an antimicrobial cellulose fiber structure comprising the reactive antimicrobial compound chemically fixed to a cellulose fiber such that the reactive antimicrobial compound is contained in an amount of 0.1 to 10.0% by weight with respect to the weight of the cellulose fiber.

2. An antimicrobial cellulose fiber composition comprising:
    a reactive antimicrobial compound comprising an antimicrobial agent and a reactive compound, wherein the reactive compound comprises a mixture of cyanuric chloride, tetrachloropyrimidine, chlorocarbonyldichloroquinoxaline, sulfoethanesulfonic acid, epichlorohydrin, glyoxalurethane, and bromoacrylamide, and wherein the antimicrobial agent comprises a mixture of one or more macrolides, one or more aminoglycosides, one or more cephems, one or more penicillins, one or more chitosans, one or more chitins, one or more hyaluronic acids, one or more alginic acids, one or more carrageenans, one or more xanthans, one or more gellans, one or more amino acids, one or more proteins, one or more quinolones, one or more sulfonamides, one or more diamidines, one or more bisphenols, one or more guanidines, one or more biguanides, one or more imidazoliums, one or more hexidines, one or more sulfanilic acids, one or more salicylic acids, one or more aminobenzoic acids, one or more hydantoins, one or more imidazolidinones, one or more antifungals, and one or more antivirals, and wherein the reactive antimicrobial compound further comprises one or more alkalis comprising sodium percarbonate; and
    an antimicrobial cellulose fiber structure comprising the reactive antimicrobial compound chemically fixed to a cellulose fiber such that the reactive antimicrobial compound is contained in an amount of 0.1 to 10.0% by weight with respect to the weight of the cellulose, wherein the cellulose fiber comprises one or more vegetable fibers.

3. An antimicrobial cellulose fabric composition comprising multiple antimicrobial fibers, wherein each of the antimicrobial cellulose fiber instances comprises:
    a reactive antimicrobial compound comprising an antimicrobial agent and a reactive compound, wherein the reactive compound comprises a mixture of cyanuric chloride, tetrachloropyrimidine, chlorocarbonyldichloroquinoxaline, sulfoethanesulfonic acid, epichlorohydrin, glyoxalurethane, and bromoacrylamide, and wherein the antimicrobial agent comprises a mixture of one or more macrolides, one or more aminoglycosides, one or more cephems, one or more penicillins, one or more chitins, one or more hyaluronic acids, one or more carrageenans, one or more gellans, one or more diamidines, one or more imidazoliums, one or more hexidines, one or more salicylic acids, one or more aminobenzoic acids, one or more hydantoins, and one or more imidazolidinones, and wherein the reactive antimicrobial compound further comprises one or more alkalis comprising sodium percarbonate; and an antimicrobial cellulose fiber structure comprising the reactive antimicrobial compound chemically fixed to a cellulose fiber such that the reactive antimicrobial compound is contained in an amount of 0.1 to 10.0% by weight with respect to the weight of the cellulose fiber.

4. An antimicrobial cellulose fabric composition comprising multiple antimicrobial fibers, wherein each of the antimicrobial cellulose fiber instances comprises:

a reactive antimicrobial compound comprising an antimicrobial agent and a reactive compound, wherein the reactive compound comprises a mixture of cyanuric chloride, tetrachloropyrimidine, chlorocarbonyldichloroquinoxaline, sulfoethanesulfonic acid, epichlorohydrin, glyoxalurethane, and bromoacrylamide, and wherein the antimicrobial agent comprises a mixture of one or more macrolides, one or more aminoglycosides, one or more cephems, one or more penicillins, one or more chitosans, one or more chitins, one or more hyaluronic acids, one or more alginic acids, one or more carrageenans, one or more xanthans, one or more gellans, one or more amino acids, one or more proteins, one or more quinolones, one or more sulfonamides, one or more diamidines, one or more bisphenols, one or more guanidines, one or more biguanides, one or more imidazoliums, one or more hexidines, one or more sulfanilic acids, one or more salicylic acids, one or more aminobenzoic acids, one or more hydantoins, one or more imidazolidinones, one or more antifungals, and one or more antivirals, and wherein the reactive antimicrobial compound further comprises one or more alkalis comprising sodium percarbonate; and an antimicrobial cellulose fiber structure comprising the reactive antimicrobial compound chemically fixed to a cellulose fiber such that the reactive antimicrobial compound is contained in an amount of 0.1 to 10.0% by weight with respect to the weight of the cellulose, wherein the cellulose fiber comprises one or more vegetable fibers.

5. The antimicrobial cellulose fiber composition of claim 1, wherein the cellulose fiber comprises one of: one or more vegetable fibers, one or more regenerated fibers, one or more naturally occurring protein fibers, and one or more regenerated protein fibers.

6. The antimicrobial cellulose fabric composition of claim 3, wherein the cellulose fiber comprises one of: one or more vegetable fibers, one or more regenerated fibers, one or more naturally occurring protein fibers, and one or more regenerated protein fibers.

* * * * *